United States Patent Office 3,272,867
Patented Sept. 13, 1966

3,272,867
PROCESS FOR CATALYTIC HYDROGENATION
OF ADIPONITRILE
John W. Conner, Phillip W. Evans, Albert J. Isacks, Jr., and Chester P. Neiswender, Jr., Pensacola, Fla., assignors to Monsanto Company, a corporation of Delaware
No Drawing. Filed Apr. 3, 1963, Ser. No. 270,161
5 Claims. (Cl. 260—583)

This invention relates to an improved catalytic hydrogenation process and more particularly to an improvement in the preparation of hexamethylenediamine by the hydrogenation of adiponitrile in the presence of a catalyst with improved service life.

Hexamethylenediamine is an important intermediate for the synthesis of polyamides and polyester amides, and its preparation has been the subject of many investigations. A successful and reasonably efficient method for commercial preparation of hexamethylenediamine is by the hydrogenation of adiponitrile in the presence of ammonia and either a nickel or cobalt catalyst. This process may be carried out either on a batch or continuous basis. The batch method may comprise suspending a nickel or cobalt catalyst in a liquid medium containing the material to be hydrogenated and agitating the mixture with hydrogen gas until the required quantity of hydrogen has been absorbed. This batchwise method of hydrogenation has the advantage that sufficient time may be allowed for the process to reach any desired stage of completion and the disadvantage that the process is discontinuous and hence more costly than if the equipment for the hydrogenation were kept in constant use.

The continuous process, which is in much greater commercial favor, may comprise bringing a heated fluid mixture of essentially ammonia, hydrogen, and adiponitrile into contact with a stationary solid hydrogenation catalyst. The ammonia and the adiponitrile may be co-mingled at first and the mixture allowed to mix with a stream of hydrogen en route to the catalyst chamber or separate streams of the individual reactants may be allowed to converge in any manner suitable for obtaining the proper proportions of the individual reactants.

Although many improvements have been effected in commercial continuous hydrogenation processes for the production of hexamethylenediamine, even the most sophisticated of these processes must be terminated at some time because of detrimental reduction or loss in the ability of the catalyst to aid or effect the required hydrogenation. This loss in catalyst activity occurs, regardless of hydrogenation operating temperature, at some point of time in the operation of the process dependent upon the operating conditions for the process and the amount of material which has been hydrogenated by given catalyst as well as other factors. Although it is known to vary the hydrogenation temperature and pressure and to use catalyst additives to increase the yield of hydrogenated material from a given quantity of catalyst none of these methods is completely successful either singly or in combination.

An object of this invention, therefore, is to prepare hexamethylenediamine by catalytically hydrogenating adiponitrile by an improved process.

Another object is to provide an improved process for the preparation of hexamethylenediamine by the catalytic hydrogenation of adiponitrile with minimum formation of by-products and maximum yields.

Another object is to provide an improved process for hydrogenating adiponitrile to hexamethylenediamine in the presence of a catalyst having improved yield and service life.

Still another object is to provide a method of preparation of a hydrogenation catalyst having improved service life and activity.

A still further object is to provide an improved hydrogenation catalyst having increased service life and activity.

These and other objects of this invention will be apparent from the description hereinafter.

In accordance with this invention it has been discovered that the above and other objects are accomplished by hydrogenating adiponitrile under controlled conditions of temperature and pressure in the presence of ammonia and at least one of tre group of nonmagnetic catalysts comprising nickel and cobalt.

The terms "magnetic" and "nonmagnetic" as used in this specification are relative and in all instances, except those otherwise specified, magnetic is used to describe materials which exhibit ferromagnetic properties when subjected to a magnetic field of an intensity to be described later, and nonmagnetic is used to describe materials which fail to exhibit ferromagnetic properties when subjected to a magnetic field of an intensity to be described later.

In a particularly preferred embodiment of the invention, a mixture comprising at least adiponitrile, ammonia, and hydrogen is contacted with a nonmagnetic cobalt catalyst under conditions of elevated temperature and pressure to produce crude hexamethylenediamine in a high yield and containing a minimum of hydrogenation by-products.

The hydrogenation process of this invention may be performed either at a batch or continuous process, and the hydrogenation reactants, heat transfer compounds, if any, and any hydrogenation by-product suppressant or catalyst activator compounds or mixtures which may be used, may be contacted with the nonmagnetic catalyst and with each other in the liquid phase, the vapor phase, or combinations thereof depending upon the hydrogenation reactants and the desired conditions of temperature and pressure for hydrogenation.

The hydrogenation reactants, the ammonia, and any by-product suppressant or catalyst activator compounds or mixtures which may be used may be fed separately to the nonmagnetic catalyst for contacting or any two or more of the above mentioned components may be mixed with each other prior to their contact with the catalyst. In the preferred example of the hydrogenation of adiponitrile to hexamethylenediamine in the presence of a nonmagnetic cobalt catalyst, it has been found advantageous to mix the adiponitrile and the ammonia and any by-product suppressant compounds or catalyst promotors prior to the contacting of the mixture with the hydrogen and the nonmagnetic catalyst. Water may be present in minor concentrations in one or more of the compounds of the hydrogenation process feed stream or streams to the nonmagnetic cobalt catalyst without affecting the beneficial results of improved catalyst activity obtained by this invention.

The adiponitrile which may be employed in the process of this invention may be obtained from any suitable source such as the reaction of adipic acid with ammonia, the reaction of dichlorobutane with hydrogen cyanide, the hydrogenation of dicyanobutene, or other known means for the preparation thereof and should be of the degree of purity well known in the art.

The ammonia and hydrogen which may be employed in the practice of this invention may be obtained from any suitable source and also should be of the degree of purity well known in the art.

The temperature employed for the hydrogenation reaction may be between 25° C. and 200° C., and the hydrogen pressure used may be maintained between 25 and 10,000 pounds per square inch or higher. In the practice of the invention, it is preferred generally to carry out the hydrogenation at the lowest temperature and hydrogen pressure at which hydrogen is absorbed at a reasonably rapid rate. In the preferred example, the hydrogenation reaction temperature may be between 120° C. and 170° C., and the hydrogen pressure may be between 4,000 and 6,000 pounds per square inch.

A hydrogenation catalyst suitable for the practice of this invention may be prepared from cobalt or nickel catalytic materials and is obtained preferably in a finely divided form. The catalytic materials may be deposited on a porous supporting means such as pumice, kieselguhr, alumina gel, and silica gel. Catalyst may be prepared conveniently for use in the hydrogenation process by compressing the catalyst powders into pellets or briquettes, sintering the pellets or briquettes in a furnace, separating the sintered catalyst pellets or briquettes into a magnetic portion and a nonmagnetic portion, and then reducing the nonmagnetic portion thereof in a stream of hydrogen gas prior to the contacting with the hydrogenation reactants. In the preferred example, nonmagnetic cobalt catalyst pellets may be prepared from the pure oxide of the cobalt metal which may be derived by precipitation of the carbonate of the metal from a nitrate solution thereof with ammonia and carbon dioxide or with ammonium carbonate. The precipitated carbonate of the metal may then be decomposed to the oxide by roasting in air at a temperature between 300° C. and 500° C. In general, the lowest possible roasting temperature should be used to obtain the most satisfactory sintered catalyst.

The resulting oxide, in the presence or absence of the metal, then may be kneaded in a suitable kneading machin to improve its density characteristics, and the thus kneaded oxide is combined with from 1% to 5% and preferably from 2% to 4% of a lubricant and sintering aid.

Generally, the lubricants and sintering aids are solids at normal room temperatures which melt below the sintering temperature causing the granules of catalyst during the sintering to occupy a smaller space than the nonsintered catalyst and are substantially completely vaporizable at the temperature of sintering leaving practically no ash after sintering. Especially effective lubricants and sintering aids are the animal and vegetable stearins and normally higher fatty acids such as those acids containing more than 12 carbon atoms and including tridecylic, myristic, pentadecylic, and more particularly palmitic and stearic acids or esters thereof. The esters are preferably those which are solids at room temperature but are fluid at temperatures below the sintering temperature of the metal oxide and examples of such esters are the glycolic, glyceryl, and similar polyhydric alcohol esters of the acids such as glyceryl tristearate and glyceryl tripalmitate, whether of the mono or polycarboxylate types. The simple esters such as methyl, ethyl, propyl, and higher monohydric alcohol esters may be used, however, with results not as outstanding.

After the sintering aid is thoroughly distributed throughout the catalyst, the resulting mixture then may be pilled or formed into pellets by any suitable means. One such means is a Stokes rotary pelleting machine.

The pelleted mixture of catalyst and sintering aid is then heated in a suitable sintering furnace in an oxidizing atmosphere at a temperature between 500° C. and 1100° C., and preferably between 700° C. and 1100° C. In a preferred example of cobalt catalyst in the form of cylindrical pills having a diameter of about 0.25 inch and a height of about 0.25 inch, the proper sintering may take from 2 to 4 hours.

After the sintering operation, the catalyst pills are cooled slowly to a room temperature for subsequent separation into a magnetic and non-magnetic portion. In the example of the catalyst pellets described above, this cooling or annealing operation may take about 8 hours.

The cool sintered cobalt catalyst pellets may be separated into active nonmagnetic and inactive magnetic portions by either batch or continuous methods, using any suitable means such as a magnetic separator. The magnetic separator used may be either of the permanent magnet or electromagnetic type, well known in the art; and the most well known types of magnetic separators include the magnetic pulley, suspended separation magnets, spout type, drum type, and gravity induction separators. Of these types, the magnetic pulley type with either an electromagnetic or permanent magnet pulley is perhaps most easily applied to this invention. In the separation of the inactive magnetic catalyst pellets from the active nonmagnetic catalyst pellets, the strength of the magnetic field, the size of the air gaps in the magnetic circuit, and the time the pellets are in the magnetic field are variables which may be pertinent to obtaining a nonmagnetic portion of catalyst pellets which has optimum activity and service life.

The strength of the magnetic field for the separation of the sintered catalyst pellets into magnetic and nonmagnetic portions may be between 200 and 10,000 gauss; however, this field intensity may be greater, depending upon the type of magnetic separator used. In a typical example of the separation of sintered cobalt catalyst pellets of the type described above, a magnetic pulley separator having a permanent magnet with a field intensity of 500 to 2,000 gauss may be used to give good separation of the inactive magnetic portion from the active nonmagnetic cobalt catalyst pellets.

It is clear to those skilled in the art that the diameter of the magnetic pulley and the speed of the endless conveyor belt traveling around the magnetic pulley may be varied, dependent upon the field intensity of the magnetic pulley, to obtain good separation of the nonmagnetic active catalyst pellets. In general, the rate at which the catalyst pellets may be separated, the feed rate of the endless belt in the case of a magnetic pulley separator, increases with the diameter of the magnetic pulley being used, and at field intensities between 200 and 10,000 gauss, the speed of the endless belt may be between 1 and 400 feet per minute for magnetic pulley diameters between 4 and 48 inches.

The size of the air gap in the magnetic circuit and duration of the catalyst pellets in the magnetic field may be varied dependent upon the type of magnetic separator used and the field intensity of the magnet used therein. In general, to obtain good separation of the magnetic and nonmagnetic portions of the catalyst pellets, the air gap permitted in the magnetic circuit varies inversely with the intensity of the magnetic field and directly with the period of time of the catalyst pellets within the magnetic field.

The following examples will further and more specifically illustrate the nature of the present invention and in what manner the same can be carried out in practice, but it should be understood that the invention is not limited to the said examples.

EXAMPLE I

Sintered cobalt oxide catalyst pellets in the shape of cylindrical pills having a diameter of about 0.25 inch and a height of about 0.25 inch, prepared in a manner well known in the art, were separated into a magnetic and a nonmagnetic portion on a batch basis using a permanent magnet having field intensity of approximately 600 gauss by passing the permanent magnet over a stationary horizontal bed approximately ¼ inch thick of the sintered cobalt catalyst pellets at a height of approximately 0 to 3 inches. The catalyst pellets, as they adhered to the magnet, were removed from the face thereof and collected as the magnetic portion. This procedure was continued until no additional pellets were collected on the face of the magnet. The catalyst pellets remaining in the horizontal bed were collected as the nonmagnetic portion.

Forty (40) grams of the nonmagnetic cobalt oxide catalyst pellets thus obtained were charged to a standard laboratory Shaker bomb having a 1400 cc. volume. Two hundred sixteen (216) grams of adiponitrile and 150 grams of anhydrous ammonia were charged to the bomb and then the temperature was raised to 150° C. This mixture of catalyst, adiponitrile, and ammonia was pressured to 4500 pounds per square inch gauge with hydrogen gas while maintaining the temperature therein at 150° C. The rate at which the hydrogen pressure decreased was recorded as a measure of the activity of a catalyst contained in the apparatus and the results of 7 test runs and a standard unseparated catalyst run made in an identical manner to that described above are shown in Table 1 below.

*Table 1*

| Run: | Rate of decrease of hydrogen pressure in p.s.i. per minute |
|---|---|
| 1 | 39.9 |
| 2 | 38.5 |
| 3 | 43.2 |
| 4 | 43.6 |
| 5 | 48.9 |
| 6 | 48.1 |
| 7 | 46.5 |
| Standard unseparated catalyst | 36.7 |

In all instances it was found that the rate at which the hydrogen pressure within the Shaker bomb decreased was at least 5%, and generally 20% to 30%, greater than that obtained for a sintered cobalt catalyst prepared and tested in an identical manner but not separated into magnetic and nonmagnetic portions.

EXAMPLE II

Sintered cobalt oxide pellets, cylindrical in shape and having a diameter of 0.25 inch and a length of 0. 25 inch, were prepared in a manner well known in the art and separated into nonmagnetic and magnetic portions on a magnetic pulley separator comprising an endless belt traveling at 69 feet per minute concentrically with a permanent magnetic pulley 8 inches in diameter and having a magnetic field on the belt surface of 500 to 2,000 gauss intensity. Operation of the magnetic pulley separator in this manner gave a yield of 78% nonmagnetic catalyst and 22% magnetic catalyst. Nonmagnetic catalyst thus obtained was charged to standard catalyst cartridges used in the commercial continuous process for the synthesis of hexamethylenediamine by the hydrogenation of adiponitrile. A substantially identical amount of unseparated catalyst, i.e., mixed magnetic and nonmagnetic sintered cobalt catalyst pellets, were charged to the cartridges of a substantially identical commercial unit for the continuous synthesis of hexamethylenediamine by the hydrogenation of adiponitrile. These two commercial hydrogenation units were operated at substantially the same conditions of temperature and pressure for a three-months period with the amount of adiponitrile being fed to the units being varied to obtain substantially identical yields of hexamethylenediamine from each commercial unit. In each instance when a loss of catalyst activity necessitated the termination of the run, the catalysts were regenerated with hydrogen in a substantially identical manner. The number of runs made using the comparison catalyst cartridges thus made and the amounts of adiponitrile fed to each commercial unit are shown in Table 2 below.

*Table 2*

| Type of Catalyst Charged to Unit | Number of Runs per Catalyst Charge | Total Lbs. of Adiponitrile Fed to Unit at Constant Yield of Hexamethylenediamine per lb. of feed |
|---|---|---|
| Unseparated | 12 | 1,870,000 |
| Nonmagnetic | 12 | 2,325,000 |

The increased catalyst activity of the nonmagnetic catalyst over that of identical catalyst not separated into magnetic and nonmagnetic portions is shown clearly in the above table by the 24% increase obtained in the amount of adiponitrile fed to the commercial unit using the nonmagnetic hydrogenation catalyst and operated at a constant yield of hexamethylenediamine per pound of feed.

EXAMPLE III

Nonmagnetic sintered cobalt catalyst prepared in the manner described in Example II was prepared and charged to catalyst cartridges of 5 commercial continuous synthesis units for the production of hexamethylenediamine by the hydrogenation of adiponitrile, and the throughput of adiponitrile per catalyst cartridge was measured for each cartridge for 12 runs. Results of these tests are shown in Table 3 below.

*Table 3.—Throughput of Adiponitrile in 1,000 Pounds*

| Catalyst Type | Nonmagnetic Sintered Cobalt | | | | |
|---|---|---|---|---|---|
| Cartridge No | 1 | 2 | 3 | 4 | 5 |
| Run: | | | | | |
| 1 | 133 | 92 | 138 | 149 | 98 |
| 2 | 340 | 132 | 145 | 238 | 146 |
| 3 | 185 | 202 | 172 | 165 | 225 |
| 4 | 239 | 243 | 185 | 187 | 191 |
| 5 | 170 | 213 | 51 | 250 | 129 |
| 6 | 312 | 263 | 201 | 189 | 186 |
| 7 | 156 | 359 | 193 | 245 | 219 |
| 8 | 104 | 227 | 113 | 148 | 129 |
| 9 | 260 | 337 | 292 | 166 | 213 |
| 10 | 322 | 86 | 372 | 130 | 185 |
| 11 | 113 | 86 | 274 | 183 | 99 |
| 12 | 79 | 49 | 93 | 156 | 160 |

As can be seen from the table above, the amount of adiponitrile charged to each catalyst cartridge averaged 185,200 pounds per run made. This average feed rate per cartridge of adiponitrile showed a 19% increase over the average feed rate of adiponitrile to commercial synthesis units operated under substantially identical conditions during the same period and containing sintered cobalt catalyst pellets not separated into magnetic and nonmagnetic portions.

The nonmagnetic catalyst of this invention may be prepared and used in ways other than those set forth in the foregoing description and examples. For certain operating conditions, the catalyst may be supported by a suitable carrier such as silica gel, kieselguhr, diatomaceous earth, clay, bauxite, and the like. The nonmagnetic catalyst also may be combined with or used in conjunction with other catalyst or catalysts, as desired.

The nonmagnetic catalyst also may be used in other than a fixed bed arrangement. It may be prepared in small particles adapted to be maintained in a state of agitation by passage of the reactants and/or the reaction products therethrough, and alternately, it may be suspended in the liquids, gases, or vapors during the reaction, being separated therefrom and returned to the reaction zone.

Although the theory of the above described invention is not clearly understood, the advantages thereof are obvious to those skilled in the art. As can be seen clearly, by the simple expedient of separating and removing the magnetic portion of the catalyst from the catalyst mass by economical and uncomplicated methods, an active nonmagnetic catalyst results having an overall activity and service life increased by at least 15% or more, depending upon the operating conditions chosen for the hexamethylenediamine synthesis reaction. This major increase substantially offsets minimal losses of the catalyst itself resulting from the separation. Further, no changes are necessary to existing hexamethylenediamine synthesis equipment to obtain the beneficial results of this invention.

As many apparently widely different embodiments of

What is claimed is:

1. A process for catalytically hydrogenating adiponitrile to produce hexamethylenediamine comprising contacting, at a temperature between 25° C. and 200° C. and at a pressure between 25 and 10,000 pounds per square inch, a mixture comprising adiponitrile, ammonia, and hydrogen with hydrogenation catalyst selected from the group consisting of cobalt and nickel prepared from a corresponding oxide, said oxide having nonmagnetic properties when subjected to a magnetic field of intensity between 200 gauss and 10,000 gauss.

2. The process of claim 1 wherein the temperature is between 120° C. and 170° C.

3. The process of claim 1 wherein the pressure is between 4000 and 6000 pounds per square inch.

4. The process of claim 1 wherein the temperature is between 120° C. and 170° C. and the pressure is between 4000 and 6000 pounds per square inch.

5. A process for catalytically hydrogenating adiponitrile to produce hexamethylenediamine which comprises contacting, at a temperature between 25° C. and 200° C. and at a pressure between 25 and 10,000 pounds per square inch, a mixture comprising adiponitrile, ammonia, and hydrogen with a cobalt hydrogenation catalyst prepared from a cobalt oxide having non-magnetic properties when subjected to a magnetic field of intensity between 200 gauss and 10,000 gauss.

References Cited by the Examiner

UNITED STATES PATENTS

| | | | |
|---|---|---|---|
| 2,166,150 | 7/1939 | Howk | 260—583 |
| 2,225,059 | 12/1940 | Lazier | 260—583 |
| 2,677,668 | 5/1954 | Ahlberg | 252—472 |
| 2,707,706 | 5/1955 | Bauch | 252—472 |

CHARLES B. PARKER, *Primary Examiner.*

ANTON H. SUTTO, RICHARD L. RAYMOND,
*Assistant Examiners.*